United States Patent [19]

Green et al.

[11] 4,402,536

[45] Sep. 6, 1983

[54] SUNROOF LATCHING MECHANISM

[75] Inventors: Hal Green, 801 W. 9th St., Southfield; Norman L. Sorensen, Detroit, both of Mich.

[73] Assignee: American Sunroof Corporation, Southgate, Mich.

[21] Appl. No.: 219,914

[22] Filed: Dec. 24, 1980

[51] Int. Cl.$^3$ ............................................. E05C 5/04
[52] U.S. Cl. ..................................... 292/113; 49/465
[58] Field of Search ................ 292/113, 263, DIG. 5, 292/DIG. 39, DIG. 40, DIG. 51; 49/465

[56] References Cited

U.S. PATENT DOCUMENTS

| | | | |
|---|---|---|---|
| 3,129,025 | 4/1964 | Krueger | 292/113 X |
| 3,162,419 | 12/1964 | Blasingame | 292/113 X |
| 3,972,558 | 8/1976 | Horn | 296/137 B |
| 4,067,605 | 1/1978 | Green et al. | 296/137 B |
| 4,113,303 | 9/1978 | Yench | 296/137 B |
| 4,154,474 | 5/1979 | Hough et al. | 296/137 B |
| 4,186,525 | 2/1980 | Carvalho | 49/465 |
| 4,193,628 | 3/1980 | Sorensen | 296/137 B |
| 4,205,875 | 6/1980 | Smith | 296/218 |
| 4,216,983 | 8/1980 | Hough et al. | 292/263 |
| 4,268,073 | 5/1981 | Hibbert | 292/113 |

Primary Examiner—Richard E. Moore
Attorney, Agent, or Firm—Basile, Weintraub & Hanlon

[57] ABSTRACT

A latching mechanism for a sunroof for a vehicle having an opening formed in its roof includes a frame extending about the edge of the opening and has an inward projecting ledge supporting a resilient section which lies substantially parallel to the roof. A panel is provided adapted to be supported with its perimeter in abutment to the resilient section. A latch base is affixed to the underside of the panel in proximity to the edge thereof and includes a free end projecting toward the edge and spaced below the inward projecting ledge. The free end includes an inclined wall extending downward and outward and abutting the inward projecting ledge. A releasable latch means engages the frame and urges an outward movement of the latch base producing a sliding cam action with the inclined wall in abutment with the inward projecting ledge, whereby a downward movement of the panel is created with an outward movement of the latch base squeezing the resilient member between the panel and the inward projecting ledge to form a seal.

9 Claims, 7 Drawing Figures

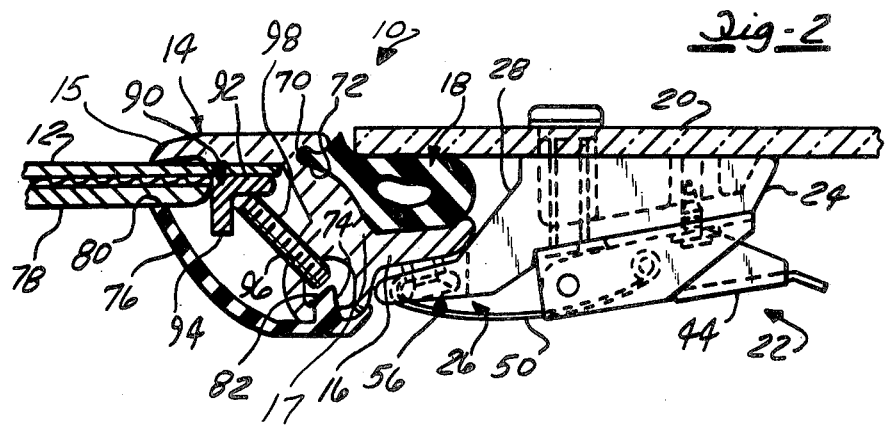
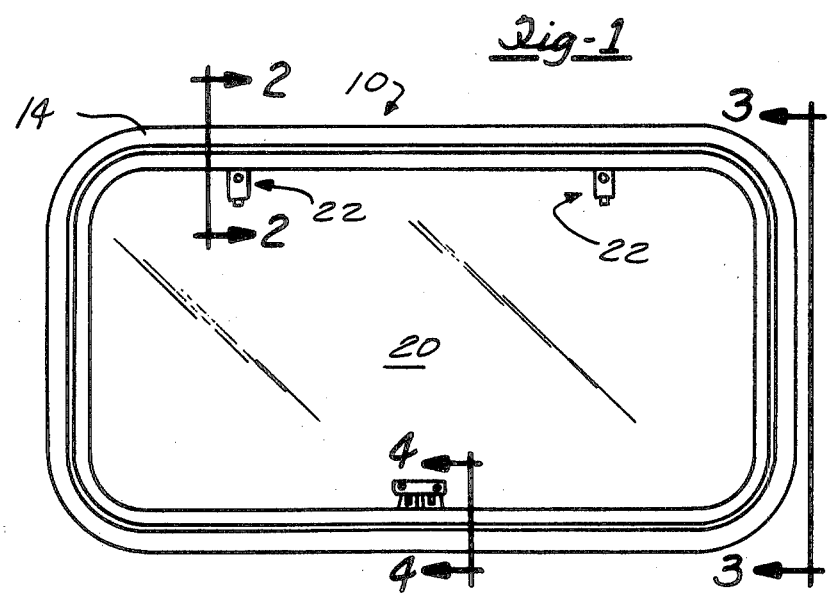
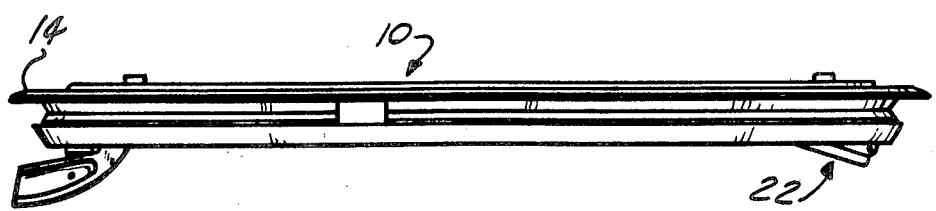

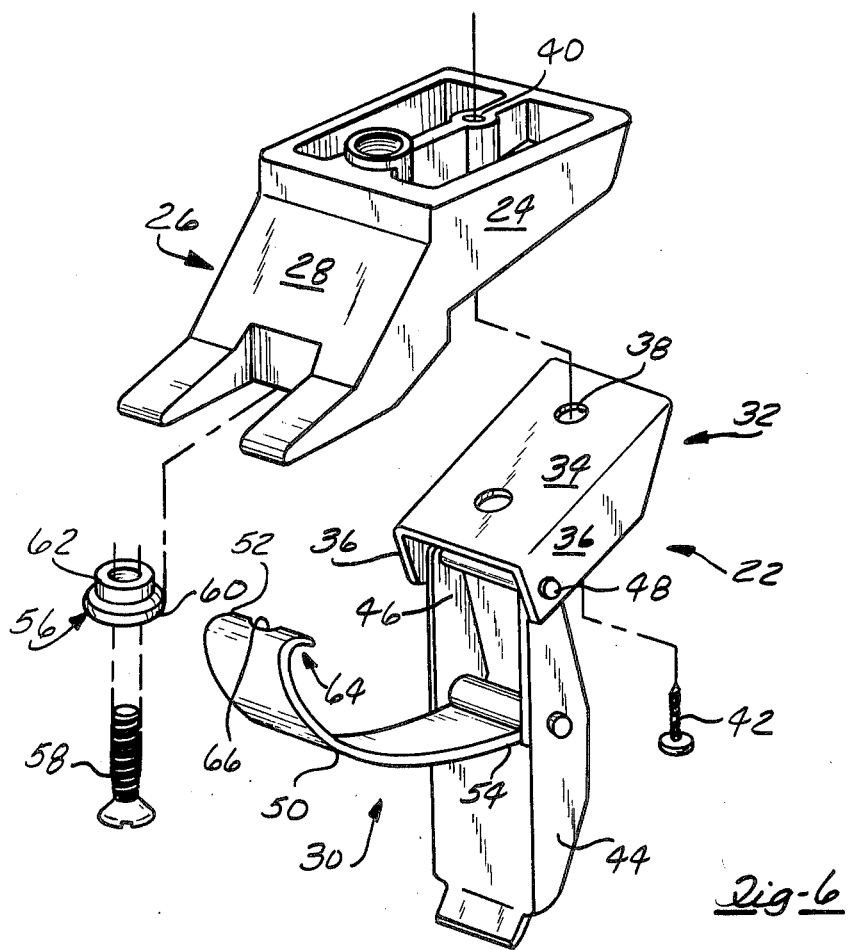
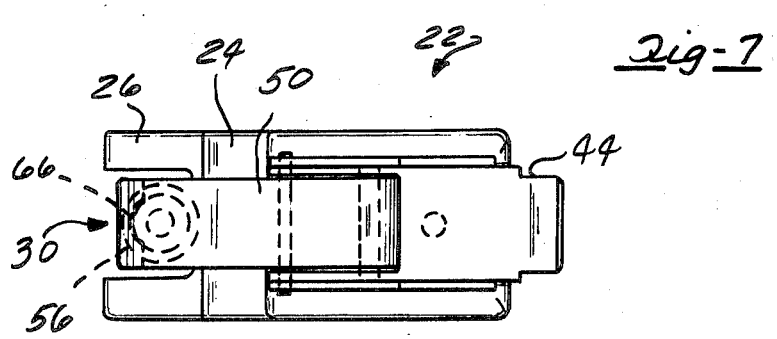

SUNROOF LATCHING MECHANISM

BACKGROUND OF THE INVENTION

1. Field of the Invention

This invention relates generally to the field of sunroofs for vehicles having an opening in their roof. More specifically, the present invention relates to the field of sunroofs having a latching mechanism for releasably latching an edge of a sunroof panel rendering the sunroof panel selectively removable.

2. Description of the Prior Art

The recent popularity of sunroofs in automobiles has lead to the development of numerous designs for sunroofs with selectively openable panels. Recent designs allow for the securement of the panel within the roof opening and allow the panel to be secured in a locked or closed position and in sealing engagement with an opening seal, and also allow the panel to be selectively placed in a vented position in which the rear edge of the sunroof panel is opened a few inches to allow some circulation of air to occur. These designs also provide for a complete removal of the sunroof panel to leave the opening unobstructed. Examples of removal sunroof panels in the prior art are disclosed in U.S. Pat. Nos. 3,972,558; 4,067,605; 4,113,303; 4,154,474; 4,186,525; 4,193,628; and 4,205,875. These patents are relevent to the applicant's invention in that they represent the closest prior art for removable sunroof panels for vehicles of which applicants are aware.

SUMMARY OF THE INVENTION

The present invention, which will be described subsequently in greater detail hereinafter, is broadly directed toward an improvement in a latching mechanism for retaining a removable sunroof panel in a vehicle opening which allows a panel to either close off the opening or to be supported with its rear edge tilted upwardly away from the rear edge of the opening so that the panel is inclined with respect to the plane of the roof providing ventilation.

As will be described subsequently in greater detail in the following description of the Preferred Embodiments of the invention, the apparatus includes a frame extending around the perimeter of the opening. The frame has a resilient molding which functions as a supporting surface substantially in the plane of the roof for retaining the edge of the panel. An inward projecting ledge of the frame supports the resilient molding or section in the manner described above. A latch base is affixed to the underside of the panel in proximity to the edge of the panel, and includes a free end projecting toward the edge and spaced below the inward projecting ledge. The free end includes an inclined wall which extends downward and outward from the panel and abuts the inward projecting ledge. A releasable latch mechanism is supported by the latch base and releasably engages the frame to urge an outward movement of the latch base to produce a sliding cam action with the inclined wall in abutment with the inward projecting ledge. A downward movement of the panel is created with and outward movement of the latch base which squeezes the resilient member between the panel and the inward projecting ledge creating a seal.

The latch base is constructed to hold the forward edge of the panel securely in place when the panel is in the partly opened position with the rear edge raised above the frame as well as when the panel is closed.

A two-part fastener is provided which separably joins the rear end of the panel to the rear end of the frame. The two-part separable fastener is movable from an over-center closed position urging the panel in abutment with the resilient member to an over-center vented position with the rear edge of the panel positioned above the frame for ventilation. In a released position, the two-part fastener is separated from the frame allowing the panel to be removed from the opening.

It is therefore an object of the present invention to provide a new and improved sunroof structure which is relatively simple in construction, yet is of low cost and is reliable in its operation.

It is a further object of the present invention to provide a new and improved two-part separable fastener for releasably joining the rear edge of the sunroof panel to the frame.

It is yet a further object of the present invention to provide a front edge releasable latching device to releasably secure a sunroof panel to a vehicle opening.

It is yet another object of the present invention to provide such a two-part separable fastener that is movable from an over-center closed position urging the panel in abutment with a resilient seal member, to an over-center vented position with the rear edge of the panel positioned above the frame for ventilation.

Further objects, advantages and applications of the present invention will become apparent to those skilled in the art of sunroofs structures when the accompanying description of the best modes for practicing the invention is read in conjunction with the accompanying drawings.

BRIEF DESCRIPTION OF THE DRAWING

In the drawing like numbers refer to like parts throughout the several views and wherein:

FIG. 1 illustrates a top plan view of the sunroof of the present invention as viewed from the top of the vehicle;

FIG. 2 illustrates a cross-sectional view of the frame taken along line 2—2 of FIG. 1;

FIG. 3 illustrates a side view of the sunroof and frame of the present invention taken along the line 3—3 of FIG. 1;

FIG. 6 illustrates an exploded view of the front edge latch assembly of the present invention; and FIG. 7 illustrates a bottom view of the front edge latch assembly of FIG. 6 in its assembled state.

DESCRIPTION OF THE PREFERRED EMBODIMENT

Figure 4:
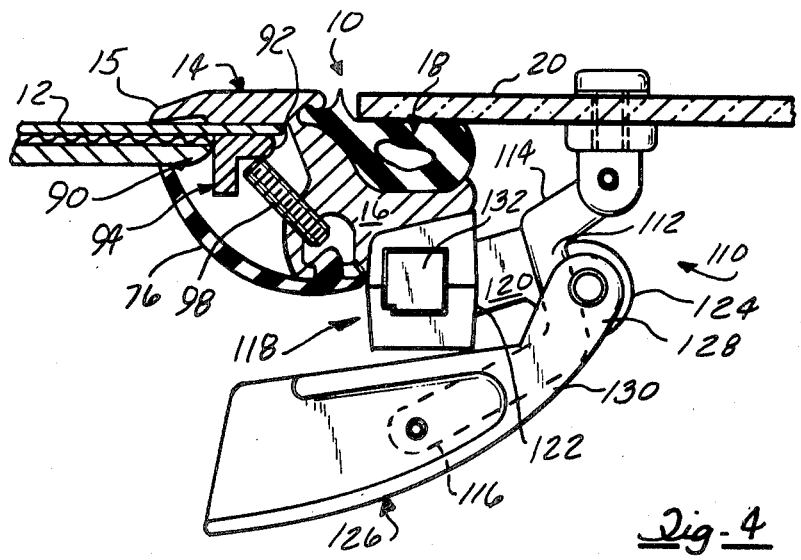
FIG. 4 illustrates a cross-sectional view of the two-part releasable latch assembly of the present invention as seen from line 4—4 of FIG. 1.

Referring now to the drawing, and in particular FIGS. 1, 2, 3 and 4, there is illustrated one example of the present invention in the form of a sunroof 10. The sunroof 10 is adapted to selectively enclose an opening in the roof 12 of a vehicle (not shown).

The sunroof 10 comprises a frame 14 extending about the edge of the opening and includes an inward projecting ledge 16 which supports a resilient member or seal 18, lying substantially parallel to the roof 12. A panel 20 is adapted to be supported with its perimeter in abutment to the resilient member 18, and in a closed position is flush with the upper surface of the frame 14.

As shown in FIGS. 6 and 7 of the drawing, a front edge latch assembly 22 is provided to releasably secure the panel 20 along its front edge to the frame 14. The front edge latch assembly 22 includes a latch base 24 affixed to the underside of the panel 20 in the proximity of the front edge. The latch base 24 includes a free end 26 projecting toward the edge and spaced below the inward projecting ledge 16. The free end 26 includes an inclined wall 28 which extends downward and outward from the panel and abuts the inward projecting ledge 16. The front edge latch assembly 22 further includes a releasable latch means 30 for releasably engaging the frame 14 and urging an outward movement of the latch base 24 to produce a sliding cam action with the inclined wall 28 in abutment with the inward projecting ledge 16 wherein a downward movement of the panel 20 is created with the outward movement of the latch base to squeeze the resilient member or seal between the panel 20 and the inward projecting ledge 16. The releasable latch means 30 includes a pivot anchor 32 comprising an upper wall 34 abutting the latch base 24 and a pair of downward extending depending side walls 36 forming a "U" shaped support. An aperture 38 formed in the upper wall 34 is aligned with a second aperture 40 formed in the latch base 24, and a self-taping screw 42 engages the aligned apertures 38, 40 to secure the pivot anchor 32 to the latch base 24. A latch arm 44 is pivotally attached at an upper end 46 to the pivot anchor 32 by means of a pivot pin 48 which engages the side walls 36 and pivotally supports the latch arm 44. A draw latch 50 includes a draw latch outer end 52 and a draw latch inner end 54 with the draw latch outer end 52 including a means for releasably engaging the frame 14 which will be described subsequently. The draw latch inner end 54 is pivotally attached to the latch arm 44 at a distance from the upper end.

The means for releasably engaging the draw latch 50 with the frame 14 comprises, as shown in FIG. 6 of the drawing, a latch keeper 56 attached to the inward projecting ledge 16 by means of a screw 58. The latch keeper 56 includes an enlarged head 60 and a cylindrical body 62 to hold the enlarged head 60 spaced a distance from the inward projecting ledge 16. The draw latch outer end 52 is curved upward in an arcuate manner to form a hook 64 to encircle the enlarged head 60, and a semi-circular recess 66 abuts the cylindrical body 62 to laterally align the free end of the hook with the latch keeper. The hook 64 encircling the enlarged head 60 vertically secures the draw latch 50 to the latch keeper 56. The latch arm 44 is movable from a first position pivoted outward with the draw latch released from the frame, to a second position with the draw latch engaging the latch keeper 56 and thus engaging the frame 14, and to a third position with the latch arm pivoted inward in an over-center position abutting the latch base with the inclined wall 28 urged against the inward projecting ledge 16 to squeeze the resilient member 18 between the inward projecting ledge and the panel 20. The resilient member 18 is made sufficiently resilient or flexible so that the front edge of the panel 20 may be pivoted and allow the panel rear edge to be elevated above the frame a distance and provide ventilation along the panel rear edge while retaining the front edge securely to the frame 14.

In a preferred embodiment, as shown in FIG. 2 of the drawing, the frame 14 further includes a resilient member retaining groove 70 recessed around the perimeter of the frame adjacent the resilient member 18, and a projecting lip 72 integral with the resilient member 18 engaging the resilient member retaining groove 70 to secure the resilient member 18 to the frame. The preferred embodiment of the frame 14 further includes a lower recess 74 formed around the frame perimeter and a headlining retainer 76 overlaying the recess and extending outward and upward therefrom abutting a headlining 78 at an outer edge 80 thereof. The headlining retainer 76 further includes a projection 82 snugly engaging the lower recess 74 to retain the headlining retainer in position.

The frame 14 is secured to the roof 12 by means of an installation ring 90. The installation ring 90 extends around the perimeter of the opening and includes an upper flange 92 abutting an inside surface of the roof 12. A downward extending stiffening flange 94 is provided integral with the outward flange 92, and a plurality of threaded apertures 96 are formed in the inward projecting ledge 16 with the axis of the threaded apertures 96 intersecting an inside corner formed by the intersection of the upper flange 92 and the stiffening flange 94. A plurality of threaded fasteners 98 threadingly engage the threaded apertures 96 and abut the intersection to secure the frame to the roof. In the preferred embodiment, the threaded apertures 96 are adjacent the lower recess 74 (FIG. 2) and the headlining retainer 76 extends inward a distance to cover the threaded apertures 96 and provide a smooth ornamental covering for the interior portion of the frame 14. As also can be seen in FIG. 2 of the drawing, the headlining retainer 76 covers the threaded fasteners 98 and the installation ring 90 when it has been put in place.

Figure 5:
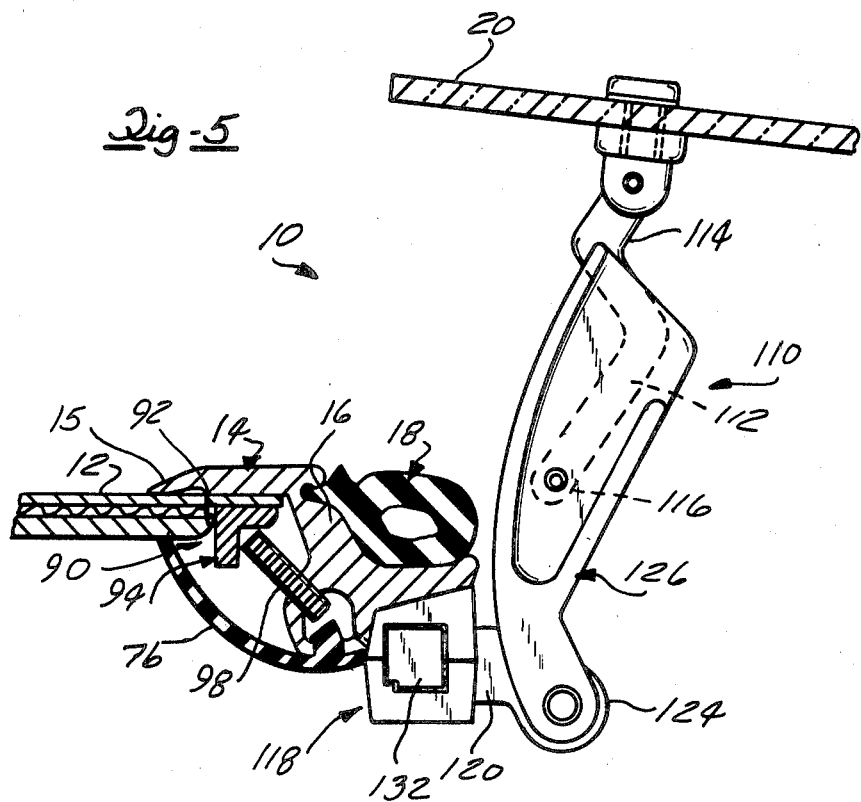
FIG. 5 illustrates the two-part releasable latch assembly of FIG. 4 in the vented position.

Referring now to FIGS. 4 and 5 of the drawing, the sunroof 10 further includes a two-part separable fastener 110 for releasably joining the opposed or rear edge of the panel 20 to the frame 14. The two-part fastener 110 is movable from an over-center closed position urging the panel rear or opposed edge in abutment with the resilient member 18 as shown in FIG. 4 of the drawing, to an over-center vented position as shown in FIG. 5 with the opposed edge positioned above the frame. The two-part separable fastener 110 comprises a link 112 having a first end 114 and a second end 116. The link first end 114 is pivotally attached to the underside of the panel near the opposed edge. A releasable latch assembly 118 is affixed to an underside of the frame 14 beneath the rear edge of the panel 20. A releasable link 120 includes a releasable link first end 122 releasably engageable with the latch assembly 118 and a releasable link second end 124. A pivoting handle 126 is pivotally attached at an upper end 128 to the releasable link second end 124. The pivoting handle 126 includes a channel 130 to slidingly and nestingly receive the link 112, and the second end of the link 116 is pivotally attached to the handle 126 within the channel 130 at a central portion thereof. The two-part fastener 110 further includes a latch means 132 for releasably engaging the releasable link 120 and the releasable latch assembly 118. A counter-clockwise pivoting of the pivoting handle 126 from its position shown in FIG. 4 translates the two-part fastener from an over-center closed position to an over-center vented position as illustrated in FIG. 5 of the drawing. With the panel 20 in the vented position as illustrated in FIG. 5, a transverse movement of the latch means 132 releases the releasable link 120 from engagement with the latch means 118 and the rear edge of the panel 20 can be separated from the frame. Rotation or movement of the latch arm 44 to the first position releases the draw latch 50 from engagement with the frame releasing the front edge of the panel 20 from the frame 14 and permitting removal of the panel from the frame.

There has been described herein above a sunroof for a vehicle with a removable panel that can be used to enclose the vehicle, can have its rear edge elevated to a vented position, and can be released from attachment to the vehicle frame and removed from the opening to provide an unobstructed opening. The sunroof of the present invention is convenient to use and economical to manufacture.

The dog-legged configuration of the link allows the link to achieve the over-center open position and the over-center closed position. The dog-legged shape also allows a low profile for the two-part fastener in the closed and vented positions.

It should be understood by those skilled in the art of vehicle sunroofs that other forms of the applicants' invention may be had, all coming within the spirit of the invention and the scope of the appended claims.

Having thus described our invention what we claim is:

1. A sunroof for a vehicle having an opening in its roof comprising:
   a frame extending about the edge of the opening and including an inward projecting ledge; a resilient member lying substantially parallel to the roof and supported by said inward projecting ledge;
   a panel adapted to be supported with its perimeter in abutment with the resilient member;
   a latch assembly including a latch base affixed to the underside of the panel in proximity to the edge thereof, said latch base having a free end projecting toward the edge, said free end being spaced below said inward projecting ledge;
   said free end including an inclined wall extending downward and outward, the inclined wall abutting said inward projecting ledge; and
   releasable latch means for engaging said frame and urging an outward movement of said latch base producing a sliding cam action with said inclined wall in abutment with said inward projecting ledge whereby a downward movement of the panel is created with the outward movement of said latch base squeezing said resilient member between the panel and said inward projecting ledge.

2. The vehicle sunroof as defined in claim 1 wherein the releasable latch means comprises:
   a latch arm pivotally attached at an upper end to said latch base;
   a draw latch including an outer end and an inner end, said draw latch outer end including a means for releasably engaging the frame, said draw latch inner end pivotally attached to the latch arm at a distance from the upper end; and
   wherein said latch arm is movable from a first position pivoted outward with said draw latch released from the frame, to a second position with said draw latch engaging the frame, to a third position with said latch arm pivoted inward in an over-center position abutting said latch base with said inclined wall urged against said inward projecting ledge squeezing said resilient member between said inward projecting ledge and the panel.

3. The vehicle sunroof as defined in claim 1 wherein the frame further comprises:
   a resilient member retaining groove recessed around the perimeter of the frame adjacent said resilient member; and
   a projecting lip integral with said resilient member engaging said resilient member retaining groove to secure said resilient member to the frame.

4. The vehicle sunroof as defined in claim 1 further comprising:
   a lower recess formed around the frame perimeter; and
   a headlining retainer overlaying said lower recess extending outward and upward therefrom abutting the headlining at an outer edge thereof, a retaining projection integral with said headlining retainer including a projection snugly engaging said lower recess to retain said headlining retainer in position.

5. The vehicle sunroof as defined in claim 1 further comprising:
   an installation ring extending around the perimeter of the opening and including an upper flange abutting an inside surface of the roof;
   a downward extending stiffening flange integral with an outer edge of said upper flange;
   a plurality of threaded apertures formed in said inward projecting ledge, the axis of said threaded apertures intersecting an inside corner formed by the intersection of said upper flange and said stiffening flange; and
   a plurality of threaded fasteners threadingly engaging said threaded apertures and abutting said intersection to secure said frame to the roof.

6. The vehicle sunroof as defined in claim 2 wherein the means for releasably engaging said draw latch with said frame comprises:
   a latch keeper attached to said inward projecting ledge including a cylindrical body and an enlarged head spaced from said inward projecting ledge;
   said draw latch outer end curved upward in an arcuate manner forming a hook to encircle said enlarged head, with a semi-circular recess formed in a free end of said hook; and
   wherein said hook encircling said enlarged head vertically secures said draw latch to said latch keeper and said recess embracing said cylindrical body transversely secures said draw latch to said latch keeper.

7. The vehicle sunroof as defined in claim 6 wherein the releasable latch is pivotable about said latch keeper allowing an opposed edge of the panel opposite said latch base to be elevated above said frame.

8. The vehicle sunroof as defined in claim 7 further comprising:
   a two-part separable fastener for releasably joining said opposed edge to said frame;
   said two-part fastener movable from an over-center closed position urging the opposed edge in abutment with said resilient member to an over-center vented position with the opposed edge positioned above the frame.

9. The vehicle sunroof as defined in claim 8 wherein the two-part separable fastener comprises:
   a link including a first end and a second end, said first end pivotally attached an underside of the panel near said opposed edge;
   a releasable latch assembly affixed to the frame;

a releasable link including a first end and a second end, said first end releasably engageable with said latch assembly;

a pivoting handle pivotally attached at an upper end to said releasable link second end, a channel for said link forming along said pivoting handle to nestingly receive said link, said second end of said link pivotally attached to said handle within said channel at a central portion thereof; and latch means for releasably engaging said releasable link and said releasable latch assembly.

* * * * *